United States Patent [19]

Gaither

[11] Patent Number: 4,583,578
[45] Date of Patent: Apr. 22, 1986

[54] SEALING DEVICE FOR FACILITATING PRESSURING OF TUBELESS TIRES

[76] Inventor: Dolphard Gaither, Cameron, Okla.

[21] Appl. No.: 713,994

[22] Filed: Mar. 20, 1985

Related U.S. Application Data

[63] Continuation-in-part of Ser. No. 427,952, Sep. 29, 1982, Pat. No. 4,506,719.

[51] Int. Cl.$^4$ ............................................. B60C 25/00
[52] U.S. Cl. ..................................................... 157/1.1
[58] Field of Search .................. 157/1, 1.1, 1.17, 1.21

[56] References Cited

U.S. PATENT DOCUMENTS

| | | | |
|---|---|---|---|
| 3,552,469 | 1/1971 | Corless | 157/1.1 |
| 3,596,698 | 8/1971 | Jordan | 157/1.1 |
| 3,665,995 | 5/1972 | Middleton, Jr. | 157/1.1 |
| 3,974,005 | 8/1976 | Graml | 157/1.1 |

Primary Examiner—James G. Smith
Attorney, Agent, or Firm—Head, Johnson & Stevenson

[57] ABSTRACT

A sealing device for facilitating pressuring of tubeless tires and comprising an endless hollow ring member adapted to be positioned at the hiatus between a deflated tire and the associated wheel rim, an inner tube disposed within the interior of the hollow ring and extending through at least a portion of the circumference thereof, a cable extending through the inner tube and a helical spring extending around the remaining portion of the circumference of the hollow tube and having the opposite ends thereof secured to the ends of the cable for retaining the spring, cable and inner tube within the hollow ring. When air pressure is directed into the interior of the tire, the sealing device installed at the hiatus between the tire and the wheel substantially precludes the escape of the air at the hiatus, and when the internal pressure of the tire reaches a predetermined level, the ring member is automatically disengaged from the tire and wheel. The internally disposed structures of the ring member preclude the necessity of manual holding of the ring member in the position during the pressuring operation, and the adjustment of the spring tension within the ring determines the internal pressure of the tire required for the release of the device.

4 Claims, 7 Drawing Figures

SEALING DEVICE FOR FACILITATING PRESSURING OF TUBELESS TIRES

CROSS-REFERENCE TO RELATED APPLICATION

This application is a continuation-in-part of my co-pending application Ser. No. 427,952, filed Sept. 29, 1982, and entitled "Sealing Device for Facilitating Pressuring of Tubeless Tires" now U.S. Pat. No. 4,506,719.

BACKGROUND OF THE INVENTION

1. Field of the Invention

This invention relates to improvements in tire pressuring devices and more particularly, but not by way of limitation, to a sealing device for facilitating the pressuring of tubeless tires.

2. Description of the Prior Art

The pressuring of tubeless tires, and particularly the tires utilized on large vehicles, is a problem in that the inner periphery of the depressured tire is loosely disposed around the outer periphery of the tire wheel, and the application of air under pressure into the interior of the tire leaks through the space between the tire bead and the wheel rim. It is quite difficult to seal this hiatus between the tire and the wheel, and in fact the tire may explode during the pressuring operation, causing injury and perhaps even fatality. Devices have been developed for overcoming this problem, such as those shown in the Ranallo U.S. Pat. No. 2,874,759, issued Feb. 24, 1959, and entitled "Bead Seating and Inflating Device for Tubeless Tires;" the Varvaro U.S. Pat. No. 2,874,761, issued Feb. 24, 1958, and entitled "Bead Seating and Inflating Device for Tubeless Tires;" the Ericson et al U.S. Pat. No. 3,280,880, issued Oct. 25, 1966, and entitled "Method of and Apparatus for Inflating Tubeless Tires;" the Corless U.S. Pat. No. 3,552,469, issued Jan. 5, 1971, and entitled "Tire Bead Seater;" the Jordan U.S. Pat. No. 3,596,698, issued Aug. 3, 1971, and entitled "Tire Installation Device;" the Kaminskas et al U.S. Pat. No. 3,658,109, issued Apr. 25, 1972, and entitled "Device for Mounting and Inflating Tubeless Tires;" the Middleton, Jr. U.S. Pat. No. 3,665,995, issued May 30, 1972, and entitled "Diaphragm Bead Spreader;" and the Graml U.S. Pat. No. 3,974,005, issued Aug. 10, 1976, and entitled "Inflation Sealing Device for Tubeless Tires for Motor Vehicles." These devices have not proven satisfactory in the solution of the problem. For example, the Ericson et al patent discloses a device typical of that most widely used today, and the sealing ring must be held down by hand and requires substantially constant adjusting. Even with this operation, the device frequently fails, and does not result in a safe and efficient pressuring of the tire. In addition, devices of the type shown in the Kaminskas et al, Jordan and Ranallo patents are frequently "blown out" of the engagement with the tire and wheel as the pressure within the tire increases, thus not only resulting in an inadequate pressuring of the tire, but also creating a hazard to the personnel surrounding the tire.

SUMMARY OF THE INVENTION

The present invention contemplates a novel sealing means for facilitating pressuring of tubeless tires and which is particularly designed and constructed for overcoming the foregoing disadvantages. The novel device comprises a tube means formed in a circular configuration, with the opposite ends thereof in abutting relationship and secured together to form essentially an endless hollow ring. An inner tubular means extends around at least a portion of the interior of the endless ring, and a cable means extends through the inner tube and has the opposite ends thereof extending outwardly from the opposite ends of the inner tube, with at least one of the ends of the cable being accessible through a port provided in the sidewall of the endless ring. In addition, a suitable helical spring means extends through the remaining portion of the endless ring and has the opposite ends thereof removably engaged with the opposite ends of the cable means whereby the combined spring and inner tube means having the cable extending therethrough extend completely throughout the circumference of the interior of the endless ring. The spring means provides for an automatic adjustment of the overall length of the combined inner tube, cable means and spring means.

When a tubeless tire is to be pressurized, the tire and wheel are normally positioned on the surface of the ground or other substantially horizontally disposed surface, with the plane of the wheel and tire being substantially parallel thereto. This places one annular wall of the tire against the support surface, and the wheel rests against one of the tire beads by gravity, thus substantially precluding leakage of fluid therebetween, or at least reducing air loss therebetween during the air pressuring of the tire. The upper annular wall of the tire is normally loosely disposed with respect to the outer periphery of the wheel, and as the air is admitted into the interior of the tire, it tends to flow out through the hiatus between the tire beads and the rim of the wheel. The novel device of the invention is adapted to be positioned in the hiatus between the tire bead and the wheel rim to seal the space therebetween and preclude leakage of the air at the hiatus. Of course, it is the usual practice to apply a suitable lubricant, such as a detergent-water solution, or the like, around the inner periphery of the tire before seating the novel device thereon. As the air pressure within the tire increases, the tire bead begins to move in a direction toward the wheel rim, and as the hiatus therebetween begins to decrease in width, the novel device begins to move axially outwardly with respect to the tire and wheel. Whereas other devices of this general type require manual retention against the tire and wheel, the internally disposed cable means and inner tube means of the present device functions to maintain the sealing means in position between the tire bead and wheel rim until a preselected internal pressure is reached within the tire. When the internal pressure of the tire reaches this preselected amount, the novel sealing device automatically disengages from the tire and wheel, and the tire will be efficiently pressurized.

When the sealing device releases or disengages from the tire and wheel, it may "fly" out from the wheel. In order to avoid this action, it may be desirable to provide a separate rope or cable means generally similar to the starter rope of an outboard motor, lawn mower, or the like, in engagement with the sealing device. With the use of the auxiliary cable or rope means, the sealing device may be quickly and efficiently removed from the engagement with the wheel and tire immediately upon the achievement of the preselected or desired internal pressure within the tire. A slight manual "jerk" or pull on the auxiliary rope means will immediately release the sealing device from the tire when this preselected internal tire pressure is reached. The novel sealing device is simple and efficient in construction and economical and durable in construction.

DETAILED DESCRIPTION OF THE PREFERRED EMBODIMENT

Figure 1:
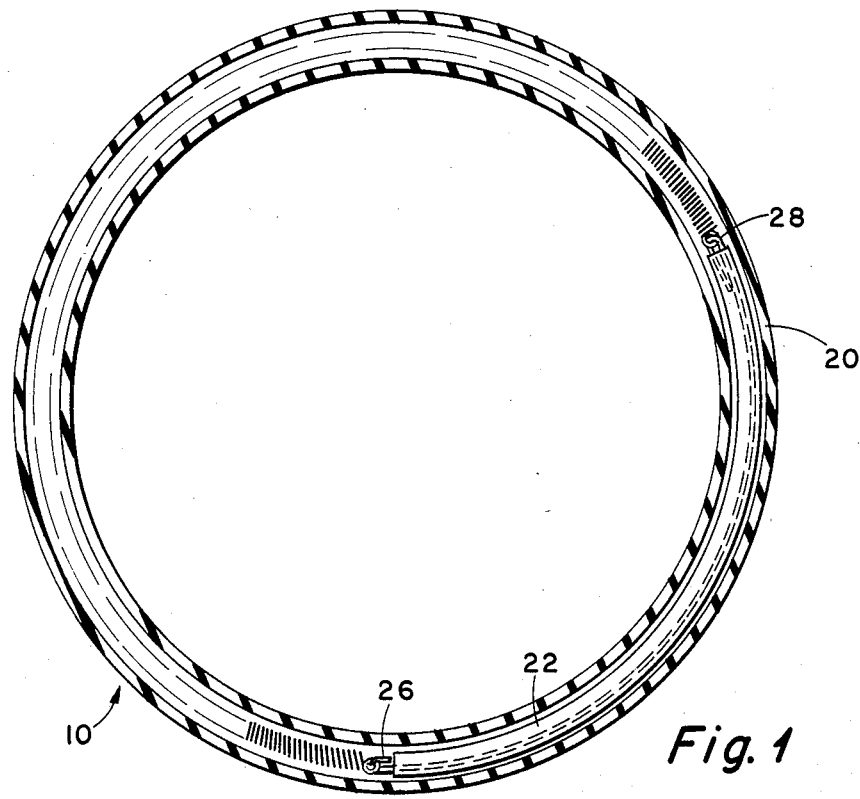
FIG. 1 is a sectional elevational view of a sealing device embodying the invention.
Figure 2:
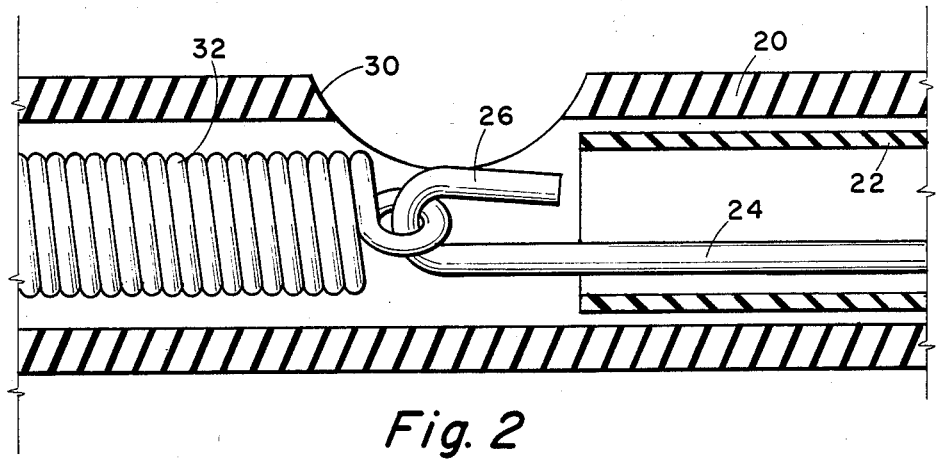
FIG. 2 is an enlarged broken sectional elevational view of a portion of a sealing device embodying the invention and particularly illustrating the connection between the cable means and spring means utilized in the device.

Referring to the drawings in detail, reference character 10 generally indicates a sealing device adapted to be positioned at the hiatus 12 between a wheel rim 14 and the bead 16 of a tubeless tire 18 in order to facilitate the inflating or pressurizing of the tire. The device 10 comprises an outer tubular member 20 formed into a substantially circular or annular configuration, as particularly shown in FIG. 1, 6 and 7 with the outer end of the tube 20 being placed in abutting relationship and secured together in any suitable manner (not shown) to provide a substantially endless ring. An inner tube means 22 is disposed within the outer tube 20 and preferably extends throughout a portion which is less than one-half the circumference of the ring 20. A cable means 24 of any suitable type, such as a wire rope, or the like, extends through the inner tube 22. The opposite ends of the cable 24 extend beyond the outer ends of the inner tube 22 terminate in hook or eye members 26 and 28. It is preferable that one of the hooks or eye members, such as the eye member 26, be disposed in the proximity of or be accessible through a port 30 provided in the sidewall of the ring 20.

A helical spring means 32 is disposed within the interior of the ring 20 and extends around the portion thereof between the ends of the cable 24 whereby the entire circumference of the ring 20 is filled by the combination of the spring means 32, the inner tube 22 and the cable 24. The opposite ends of the cable means 34 are anchored to the hook or eye means 26 and 28, and the inherent force of the spring means 32 maintains the cable 24 taut within the interior of the outer tube 20.

Figure 3:
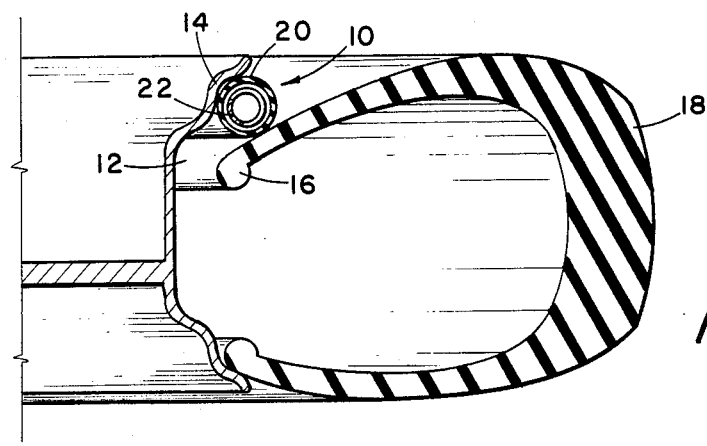
FIG. 3 is a broken sectional elevational view of a tire and wheel in a depressurized condition and having a sealing device embodying the invention installed thereon.
Figure 4:
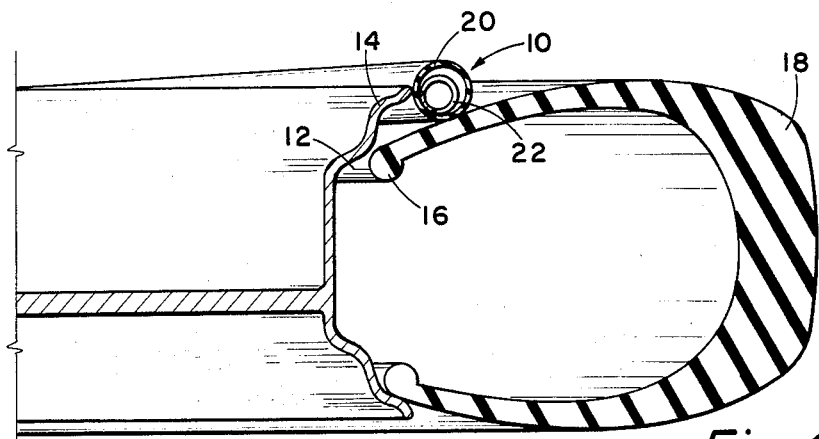
FIG. 4 is a view similar to FIG. 3 and illustrates the tire in a partially inflated condition.
Figure 6:
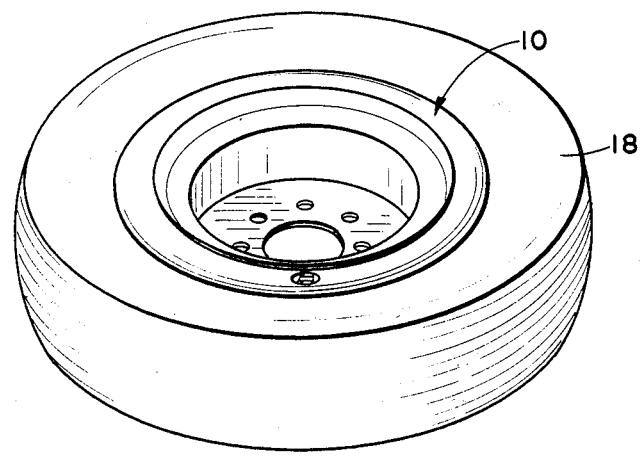
FIG. 6 is a perspective view of an entire wheel and tire having a sealing device embodying the invention installed thereon and illustrated with the tire in a deflated condition.

In order to pressurize the tire 18 by the use of the device 10 the tire 18 and wheel 14 are preferably initially placed in a substantially horizontal position as shown in FIGS. 3, 4 and 6 whereby the under or lower portions of the wheel and tire are held in an engaged position by gravity. This provides at least a minimal sealing between the tire and the wheel during the pressuring of the tire. The device 10 may then be positioned between the tire bead 16 and the wheel rim 14 for sealing the hiatus 12 therebetween, as particularly shown in FIGS. 3 and 6. Air may then be applied or directed to the interior of the tire 18 through the usual valve stem (not shown) in the usual or well known manner. The device 10 substantially precludes leakage of air pressure or fluid pressure at the hiatus 12 as the air is being admitted into the interior of the tire 18.

Figure 5:
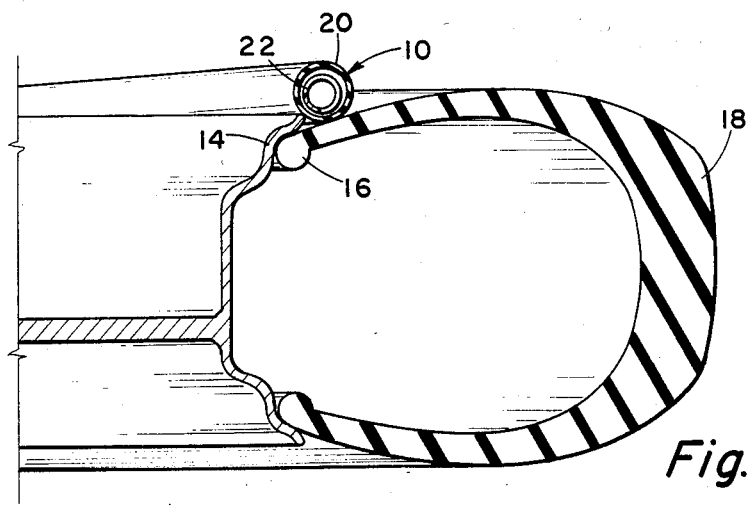
FIG. 5 is a view similar to FIGS. 3 and 4 and illustrates the tire in a completed inflated position.
Figure 7:
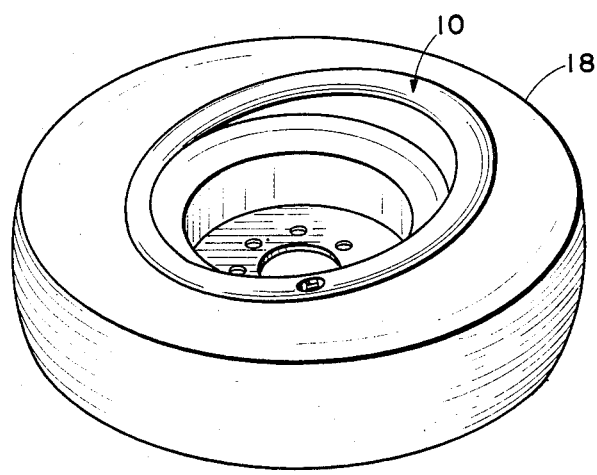
FIG. 7 is a view similar to FIG. 6 and illustrates the tire in a fully inflated condition with the sealing device embodying the invention being released from engagement with the tire and wheel.

As the air pressure within the tire increases, as shown in FIG. 4, the tire bead 16 is flexed axially outwardly in a direction toward the wheel rim 14, and comes into engagement therewith. This closes the hiatus 12, and the device 10 begins to move axially outwardly from the position between the tire 18 and rim 14. When the tire 18 reaches the full internal pressurization thereof, as shown in FIGS. 5 and 7, the ring 20 or device 10 is forced completely out of engagement with the tire and "pops" away from engagement with the wheel rim 14.

The device 10 may be adjusted for release from engagement with the tire and wheel at substantially any desired internal pressure for the tire 18. For example, if it is desired that the pressuring of the tire be ceased when the internal pressure of the tire reaches thirty p.s.i., the device 10 may be so adjusted as to automatically release from the tire-wheel assembly at this particular internal pressure of the tire. The adjustment is made by tightening or loosening of the pressure or force of the spring means 32 through the engagement thereof with the cable means 24.

In the event it is desired to preclude the "popping out" action of the device 10 when the selected internal pressure of the tire has been reached, a suitable auxiliary cable means (not shown), such as frequently used in starting an outboard motor, a lawnmower, or the like, may be removably secured to the ring 20, and the moment the device 10 releases from the tight engagement in the hiatus 12, and is positioned to indicate that the desired internal pressure of the tire has been reached, a slight manual pull or "tub" on the auxiliary cable will release the device 10 from the tire and preclude a "blowing off" of the device from the pressured tire and associated wheel.

From the foregoing, it will be apparent that the present invention provides a novel sealing device for facilitating pressuring of a tubeless tire, and comprises an endless hollow ring having adjustable cable and helical spring means extending therethrough for supporting inner tube means within the endless ring whereby the sealing device may be retained in a position between a tire bead and a wheel rim during the pressuring of the tire. The sealing device is automatically released from engagement with the tire and wheel when the internal pressure of the tire reaches a predetermined level. The novel device not only facilitates the pressuring operation of the tire but also greatly reduces the inherent dangers present in devices of this type by substantially eliminating any exploding of the tire or accidental release of the air therefrom.

Whereas the present invention has been described in particular realtion to the drawings attached hereto, it should be understood that other and further modifications, apart from those shown or suggested herein may be made within the spirit and scope of this invention.

What is claimed is:

1. A sealing device for facilitating pressuring of a tubeless tire and adapted to be positioned in the hiatus between the deflated tire and the associated wheel, the sealing device comprising hollow endless tube means, cable means extending through at least a portion of the circumference of the interior of the hollow endless tube means, and helical spring means extending through the remaining circumferential portion of the hollow ring means and having the opposite ends thereof in engagement with the opposite ends of the cable means for retaining thereof within the interior of the hollow endless tube means.

2. A sealing device as set forth in claim 1 wherein the cable means comprises an inner tube disposed within the interior of the hollow endless tube means and extending throughout a portion of the circumference thereof, and a cable extending longitudinally through the inner tube means and having the opposite ends thereof extending axially outwardly from the opposite ends of the inner tube for engagement with the helical spring means.

3. A sealing device as set forth in claim 2 and including port means provided in the sidewall of the hollow endless tube means to provide access to at least one end of the cable for facilitating adjustment of the force of the spring within the hollow endless tube means.

4. A sealing device as set forth in claim 2 wherein the opposite ends of the cable are provided with hook means for engagement with the opposite ends of the helical spring means.

* * * * *